United States Patent [19]

Brolin

[11] Patent Number: 4,714,808
[45] Date of Patent: Dec. 22, 1987

[54] INDUCTION HEATING PRESSURE WELDING WITH LINEAR BUS BAR JOINT

[75] Inventor: Charles A. Brolin, Cedar Rapids, Iowa

[73] Assignee: FMC Corporation, Chicago, Ill.

[21] Appl. No.: 902,858

[22] Filed: Sep. 2, 1986

[51] Int. Cl.$^4$ ............................................. B23K 13/00
[52] U.S. Cl. ...................................... 219/9.5; 219/8.5
[58] Field of Search ............... 219/9.5, 7.5, 8.5, 10.73, 219/10.75, 10.77, 10.79; 336/223, 232, 121, 122; 174/16 B, 68 B, 70 B, 88 B, 99 B

[56] References Cited

U.S. PATENT DOCUMENTS

| | | | |
|---|---|---|---|
| 2,892,914 | 7/1958 | Rudd | 219/9.5 |
| 2,919,335 | 12/1959 | Shaughnessy | 219/9.5 |
| 3,601,746 | 10/1971 | Teagno | 339/4R |
| 3,827,017 | 7/1974 | Keller | 336/223 |
| 4,013,329 | 3/1977 | Hugin | 339/9E |
| 4,012,616 | 3/1977 | Zelahy | 219/9.5 |

FOREIGN PATENT DOCUMENTS

| | | |
|---|---|---|
| 142,922 | 9/1984 | European Pat. . |
| 142,952 | 10/1984 | European Pat. . |
| 563,894 | 9/1944 | United Kingdom . |
| 841,155 | 10/1956 | United Kingdom . |
| 911,877 | 6/1961 | United Kingdom . |
| 972,928 | 7/1963 | United Kingdom . |
| 1,063,117 | 7/1964 | United Kingdom . |

Primary Examiner—J. R. Scott
Assistant Examiner—Leon K. Fuller
Attorney, Agent, or Firm—Ronald C. Kamp; Richard B. Megley

[57] ABSTRACT

An adjustable length linear bus bar for conducting a current between an induction heating power supply and an induction heating coil. The bus bar includes a fixed bar having a channel formed along the length of the fixed bar and a movable bar having a portion formed to slidably fit inside the channel of the fixed bar. A hydraulic ram biases the slidable bar against the fixed bar to facilitate the transfer of current between the fixed and movable bars. A clam shell type of construction allows the inductor coil to be quickly moved into and out of a gap between a pair of articles being heated.

7 Claims, 13 Drawing Figures

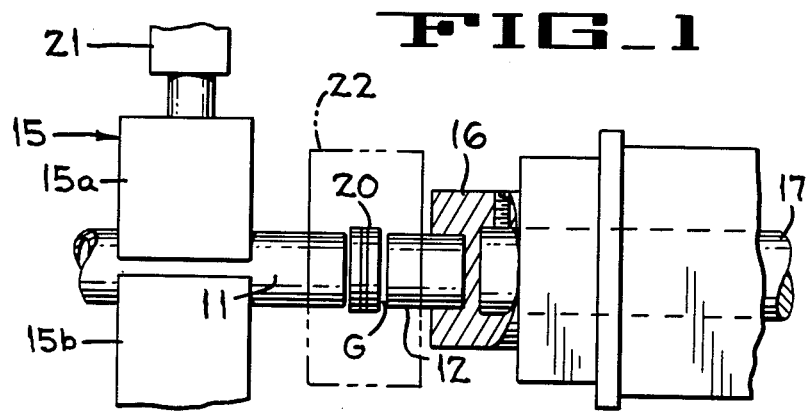
FIG_1
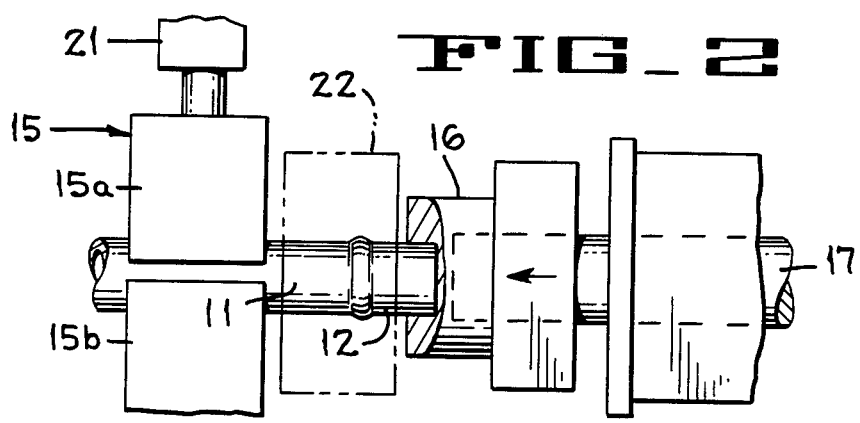
FIG_2
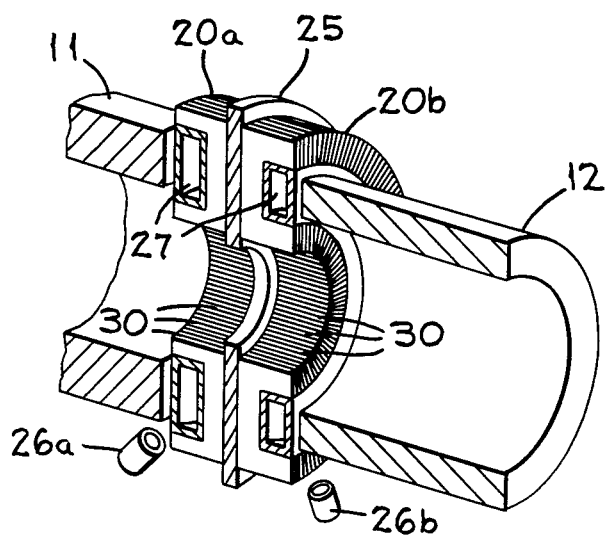
FIG_3

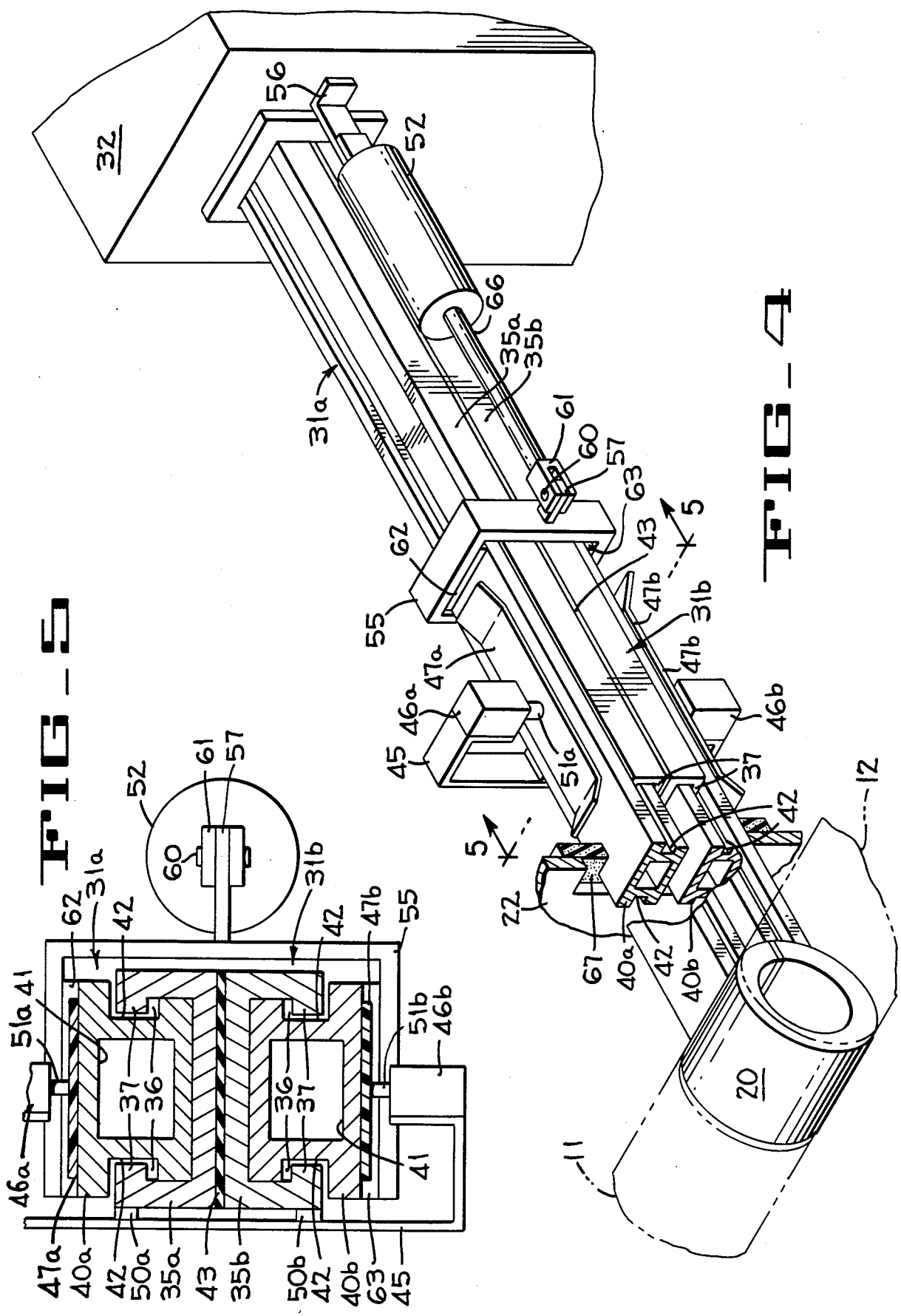

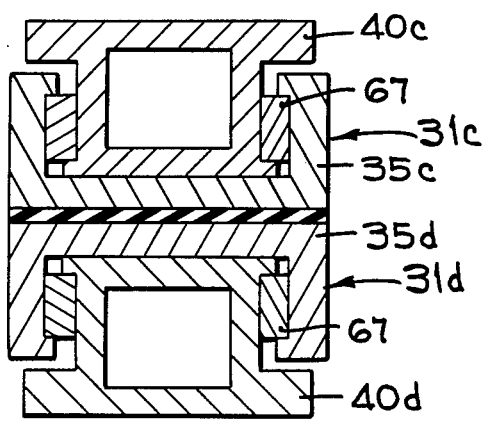
FIG_6
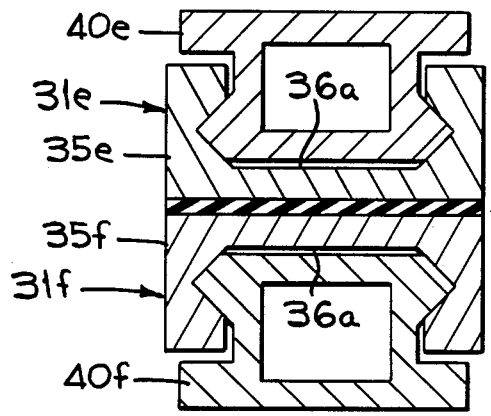
FIG_7
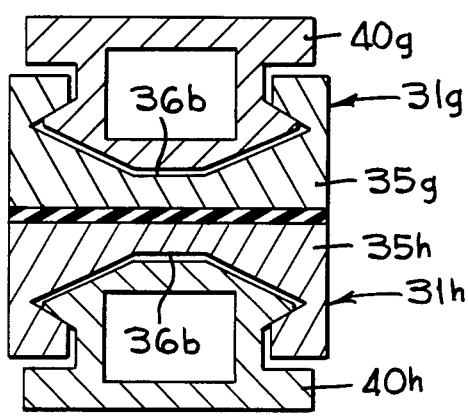
FIG_8
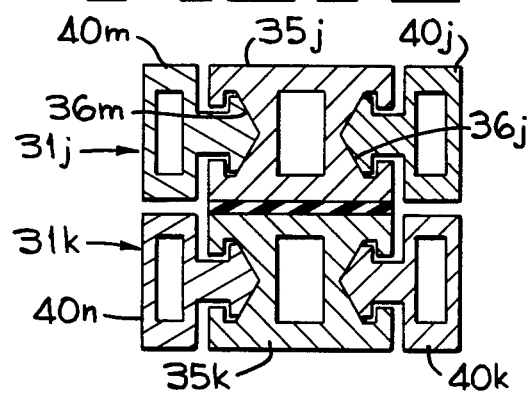
FIG_9
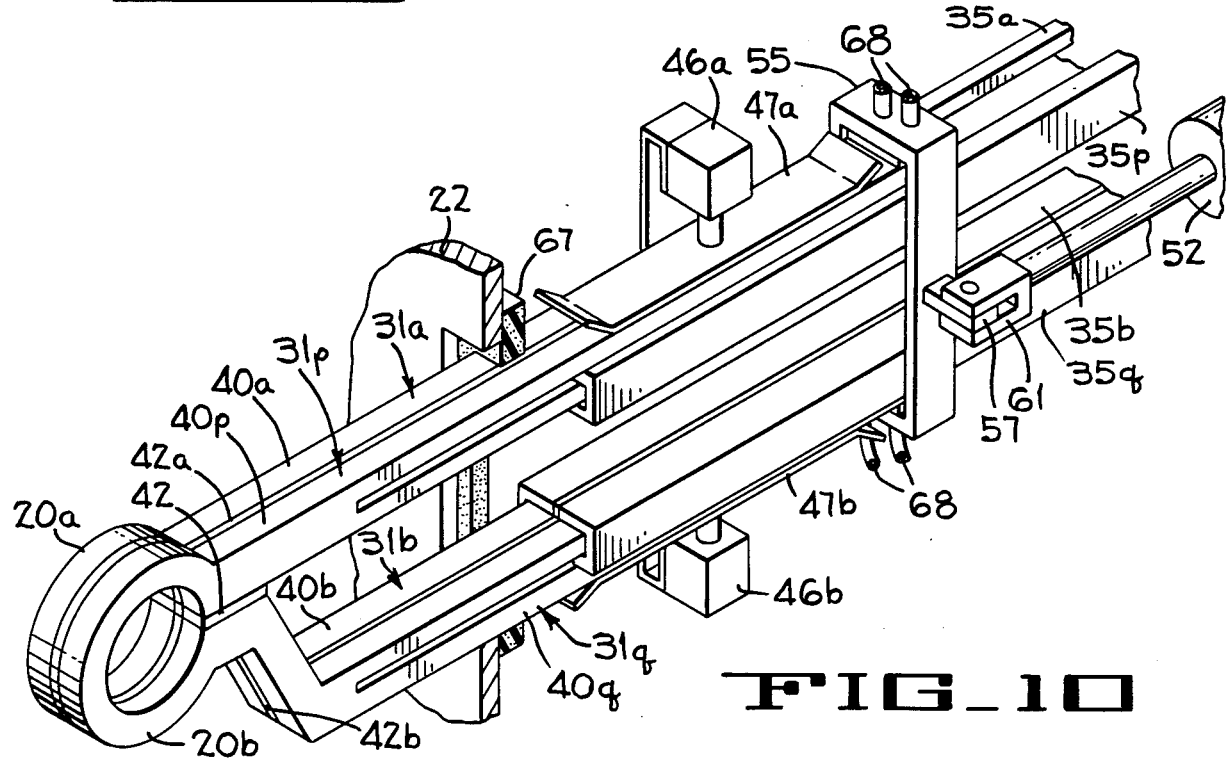
FIG_10

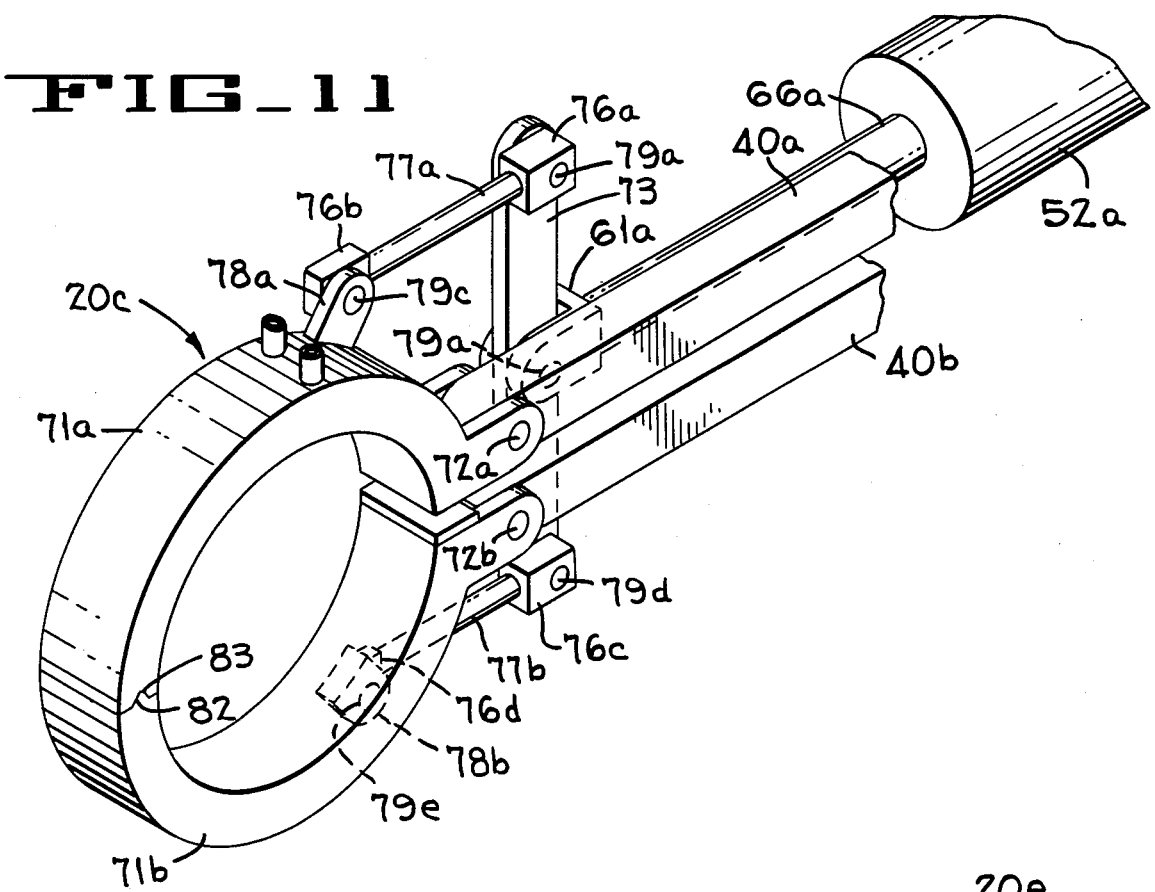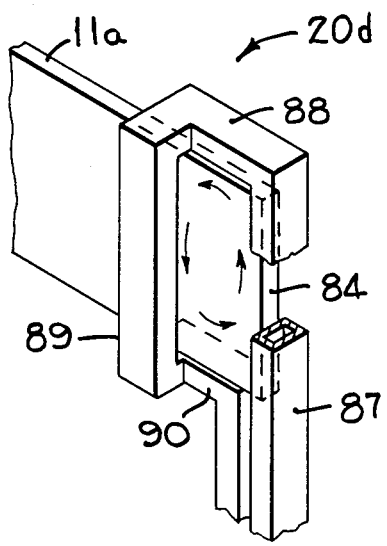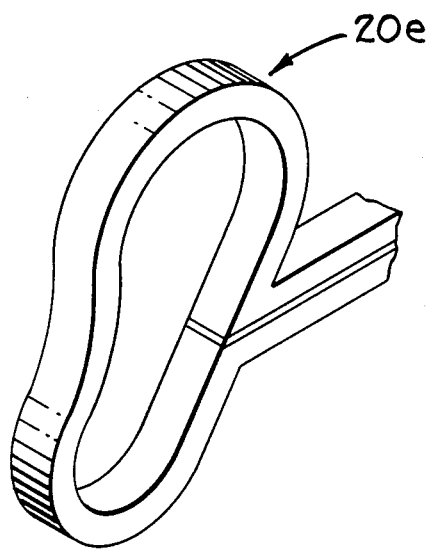

INDUCTION HEATING PRESSURE WELDING WITH LINEAR BUS BAR JOINT

CROSS REFERENCE TO RELATED APPLICATIONS

The present invention relates to the invention described in the following applications, all of which were assigned to the assignee of the present invention, and are incorporated by reference herein.

Broline Application Ser. No. 844,656 filed on Mar. 27, 1986 entitled Induction Heating Pressure Welding.

Brolin et al Application Ser. no. 895,399 filed on Aug. 11, 1986 entitled Induction Heating Pressure Welding with Pivotal Bus Bar Joint.

Broline et al application Ser. No. 895,085 filed Aug. 11, 1986 entitled Inert Atmosphere Control For Induction Heating Pressure Welding System.

Broline et al Ser. No. 896,904 filed Aug. 11, 1986 entitled Dual Induction Heating Pressure Welding Control Circuit.

BACKGROUND OF THE INVENTION

Field of the Invention

The present invention relates to induction heating equipment, and more particularly to adjustable linear bus bar joints for conducting induction heating currents between an induction coil and an induction heating power supply.

SUMMARY OF THE INVENTION

The present invention discloses induction heating apparatus having adjustable linear bus bars for connecting an induction coil to an induction heating power supply for providing induction heating to a pair of articles. The articles are positioned adjacent to each other with a small gap between them and the linear bus bars are extended to move the induction coil into the gap between the articles. An electrical current flows from the power supply through the extended bus bars and coil causing the articles to be heated to a welding temperature. The bus bars are then retracted causing the coil to be retracted from the gap and the heated articles are forced together to form a welded pair. The bus bars each include a first elongated bar having a formed channel extending along the length of the first bar and a second elongated bar having a portion formed to slidably fit inside the channel of the first bar. The second bar can be moved inside the first bar to adjust the length of the bus bar. A hydraulic ram or other means can be used to bias the second bar against the first bar to facilitate the transfer of electrical current between the first and second bars.

The induction coil can be shaped to match the contour of the portion of an article being heated by current in the induction coil. When a pair of large articles, such as large diameter pipes, are being heated for welding a clam shell type coil can be used to facilitate insertion and removal of the coil from the gap between the large articles. The clam shell coil is formed in two portions with each portion pivotally connected to one of the bus bars. The two coil portions are close together to form a single loop coil when the coil is in the gap between the articles, and the coil portions are pivoted apart and moved a short distance from the gap so the articles can be forced together when the articles reach welding temperatures. The clam shell type coil allows the inductor coil to be moved quickly into and out of the gap between the large articles with only a slight linear movement of the coil and only a slight linear extension and retraction of the linear bus bars.

BRIEF DESCRIPTION OF THE DRAWINGS

FIG. 1 is a side elevation of a portion of an induction welding apparatus with an induction coil positioned between a pair of articles to be heated.

FIG. 2 is a side elevation of the welding apparatus of FIG. 1 with the inductor coil removed and the pair of articles being pressed together to form a welded pair.

FIG. 3 is an isometric view of a pair of articles having different sizes and having a corresponding pair of inductor coils for heating the individual articles.

FIG. 4 is an isometric view of a linear bus bar joint of the present invention, with the bus bar connected between an inductor coil and a power supply.

FIG. 5 is a cross sectional view of the linear bus bar of the present invention, taken across line 5—5 of FIG. 4.

FIGS. 6–9 are cross sectional views of other embodiments of the linear bus bar joint of the present invention.

FIG. 10 is an isometric view of a set of linear bus bars, similar to FIG. 4, but having a pair of inductor coils instead of a single coil.

FIG. 11 illustrates a clam shell type inductor coil for use with extremely large articles which are to be welded together.

FIG. 12 illustrates an inductor coil for use with a small article which is to be heated.

FIG. 13 illustrates an inductor coil which can be used with a corresponding odd shaped article to be heated.

DESCRIPTION OF THE PREFERRED EMBODIMENT

An induction heating apparatus of FIG. 1 includes a pair of articles 11, 12 mounted in a pair of clamps 15, 16 with clamp 15 fixed and with clamp 16 connected to a movable rod 17. An inductor coil 20 is mounted in a gap G between articles 11, 12 to provide power for heating the articles 11, 12. A lower portion 15b of clamp 15 is fixed and an upper portion 15a is vertically movable by a hydraulic ram 21 to clamp article 11 between the upper and lower portions 15a, 15b. With the articles 11, 12 securely aligned in clamps 15, 16 the coili 20 is moved into position (FIG. 1) inside an inert gas chamber 22 and electric current is applied to the coil until the articles are heated to a welding temperature. The coil 20 is then retracted from the gap G and the article 12 pressed against article 11 by horizontal movement of the rod 17 (FIG. 2) causing the heated articles to be welded together.

When two articles 11, 12 (FIG. 3) of different sizes of different thicknesses are to be welded together a pair of coils 20a, 20b separated by an insulator 25 can be used and a pair of temperature sensors 26a, 26b used to control the maount of current to coils 20a, 20b. This insures that both articles 11, 12 reach a welding temperature before the coils are removed and the articles 11, 12 are pressed together. The coils 20a, 20b each include a water cooled core 27 partially surrounded by a plurality of laminations 30. The laminations concentrate magnetic flux from the coils 20a, 20b into the articles 11, 12 to increase heating efficiency.

Details of the linear bus bar joint of the present invention are disclosed in FIGS. 4 and 5 where a pair of bus bars 31a, 31b are connected between the inductor coil 20 and an inductor power supply 32. Each of the bus bars include a first elongated bar 35a, 35b having a channel 36 extending along the length of the corresponding bar 35a, 35b with an inwardly extending flange 37 on either side of the channel 36. A second elongated bar 40a, 40b having an internal fluid tight passage 41 extending along the length of the bar 40a, 40b is formed ot mate with the corresponding first bar 35a, 35b and is slidably mounted in the channel 36. The flanges 37 on each of the first bars 35a, 35b slidably fit in a pair of grooves 42 in the second bar 40a, 40b.

The fixed bars 35a, 35b are separated by an electrical insulator 43 (FIGS. 4, 5) and the movable bars 40a, 40b are each biased against the corresponding one of the fixed bars 35a, 35b by a bracket 45, a pair of hydraulic rams 46a, 46b and a pair of insulators 47a, 47b. The bracket 45 is connected to the fixed bars 35a, 35b by a pair of insulating strips 50a, 50b. When current is flowing in the bus bars 31a, 31b the rams 46a, 46b are extended causing a pair of rods 51a, 51b to press against the insulators 47a, 47b to clamp bars 40a, 40b against bars 35a, 35b to facilitate the transfer of current between the movable bars 40a, 40b and the corresponding fixed bars 35a, 35b. A relevantly large surface area of contact between bars 40a and 35a and between bars 40b and 35b allow the extendable bus bars 31a, 31b to carry a relatively large current. The large area of contact is due to a relatively wide cross sectional dimension and a relatively long length of overlap (contact length) between bars 40a, 35a and between bars 40b, 35b.

A hydraulic ram 52 (FIGS. 4, 5) is mounted between the power supply 32 and a bracket 55 by a pair of brackets 56, 57, a pin 60 and a clevis 61. A pair of insulating members 62, 63 connect the bracket 55 to the movable bars 40a, 40b causing the bars 40a, 40b to extend and retract as the ram 52 extends and retracts a piston rod 66. A sealing member 67 (FIG. 4) restricts the movement of gas from the inert gas chamber 22 (FIGS. 1, 2, 4).

FIGS. 6-9 disclose other embodiments of the linear bus bar joint of the present invention, but do not show the means for biasing the fixed and movable bars toward each other during current transfer. The bracket 45, rams 46a, 46b and insulators 47a, 47b disclosed in FIG. 5 are used with the embodiments of FIGS. 6-9, but are not shown in the interest of simplifying the drawings. Each of the bus bars 31c, 31d of FIG. 6 includes an elongated fixed bar 35c, 35d, a movable bar 40c, 40d and a pair of non-metallic guides and wear bars 67 to reduce friction and wear between bars 35c, 35d and 40c, 40d. The embodiment of FIG. 6 includes a relatively large contact area between bars 35c, 40c and between bars 35d, 40d to allow relatively large amounts of current in the bus bar joint.

The embodiments of the linear bus bar joint disclosed in FIGS. 7 and 8 each includes a fixed elongated bar 35e-35h having a V-shaped channel 36a, 36b extending along the length of the fixed bar, and having a slidable bar 40e-40h mounted in the corresponding channel. The V-shaped channel centers the slidable bar in the channel and insures that the coil 20 (FIGS. 1, 4) is moved into the same exact position relative to the articles 11, 12 each time a pair of articles are to be heated. This insures proper heating of both articles 11, 12 when induction current flows in the coil 20. The sliding bars 40g, 40h (FIG. 8) have a relatively large area of contact with fixed bars 35g, 35h so a relatively large current can be transferred across the bar joint.

The embodiment of the linear bus bar joint disclosed in FIG. 9 includes a fixed bar 35j having a pair of bars 40j, 40m slidably mounted in a pair of V-shaped channels 36j, 36m and similarly arranged bars 35k, 40k, 40n. This embodiment features a "thin" design which is useful when a pair of coilis 20a, 20b (FIGS. 3, 10) are used. The V-shaped channels 36j, 36m also centers the slidable bars 40j, 40m and centering a coil which is attached to the slidable bars so the coil is moved into the same position relative to the articles 11, 12 each time articles are to be heated.

Details of linear bus bar joints for use with the dual coil apparatus of FIG. 3 are disclosed in FIG. 10 wherein a plurality of linear bus bars 31a, 31b, 31p, 31q are used to provide power to the coils 20a, 20b. A plurality of hoses 68 provide liquid for cooling the movable bars 40a, 40b, 40p, 40q. Electrical insulators 42, 42a, 42b provide insulation between the movable bars.

When large articles 11, 12 (FIGS. 1, 2), such as 48 inch diameter pipes are to be welded together it takes so long to move a coil 20 linearly out of the gap G between the articles after heating that the articles start to cool before they can be forced together into a welded pair. A solution to this problem is to use a clam shell or split coil 20c (FIG. 11) having a pair of coil portions 71a, 71b pivotally mounted on the bars 40a, 40b by a pair of pins 72a, 72b. The two halves 71a, 71b are pivoted into an open position out of gap G by a hydraulic ram 52a so the articles 11, 12 can be quickly pressed together when current in coil 20c has terminated. The ram 52a is connected to the coil halves 71a, 71b by a piston rod 66a, a clevis 61a, a bar 73, a plurality of blocks 76a-76d, a pair of rods 77a, 77b, a pair of ears 78a, 78b and a plurality of pins 79a-79e. When the ram 52a retracts the piston rod 66a upper coil portion 71a pivots upwardly about a pin 72a and lower coil portion 71b pivots downwardly about pin 72b. If desired bars 40a, 40b can be movable so they can move a short distance to the right (FIG. 11) as the coil portions 71a, 71b pivot. This combination of horizontal movement of the bars 40a, 40b and pivotal movement of coil portions 71a, 71b reduces the amount of pivotal movement required to move the coil 20c from the gap G (FIG. 1) between articles 11, 12. A V-shaped groove 82 in the outer end of coil portion 71a mates with a wedge shaped ridge 83 in the outer end of coil portion 71b to provide accurate alignment of the outer ends of the coil 20c and to facilitate current flow between current portions 71a, 71b.

When it is desired to weld non-symmetrical or odd shaped articles together, the inductor coils can be formed in the general shape of the articles to provide uniform heat to the portion of the articles to be heated. Examples of these odd shaped inductor coils are disclosed in FIGS. 12 and 13. The article 11a (FIG. 12) is to narrow for a coil to be placed adjacent a face 84 which is to be heated, so a coil 20d has a portion 87 positioned parallel to the face 84 and portions 88-90 form the remainder of a loop which induces a circulating current in the article 11a. The direction of the induced circulating current is shown by the arrows on article 11a. Inductor coil 20e (FIG. 13) is an example of a coil which can be used to provide an induced current to an article having a similar shape.

Although the best mode contemplated for carrying out the present invention has been herein shown and described, it will be apparent that modification and variation may be made without departing from what is regarded to be the subject matter of the invention.

What is claimed is:

1. An induction heating pressure welding apparatus comprising an induction coil, means for clamping two articles to be welded along interfacing portions to the apparatus at a predetermined spaced apart distance between the interfacing portions for providing clearance for receiving the insertion of the coil therebetween, means for moving the coil for inserting and removing the coil between the interfacing portions of two articles, an induction power supply, means for carrying an electric current from the power supply to the coil, and means for moving at least one of the clamping means toward the other clamping means for pressure welding the heated interfacing portions of the articles together, the coil moving means and the current carrying means comprising:

first and second sets of elongated bus bars, each set having a first bus bar with one end connected to the power supply and an opposite end extending toward the coil and having a channel extending from end to end, and a second bus bar with a longitudinally extending flanged portion of a shape matching the channel in the first bus bar, the flanged portion slidably mounted in the channel of the first bus bar, one end of the second bus bar connected to the coil, the other end slidably connected to the power supply, and means for insulating the two sets from one another for completing an electrical circuit between the power supply and the coil; and means for moving the second bus bar of each set in unison longitudinally with respect to the first bus bar of each set for inserting and removing the coil between the interfacing sections of the two articles.

2. The inductions heating pressure welding apparatus according to claim 1, and biasing means for pressing facing surfaces of the flanged portion and the channel of each set together for establishing electrical contact between the first and second bus bars of each set.

3. The induction heating pressure welding apparatus according to claim 2, wherein the second bus bar of each set is provided with a coolant passageway means for carrying coolant to the coil.

4. The induction heating pressure welding apparatus according to claim 1, whereinn the coil is shaped to correspond to the interfacing portions of the articles to be welded together, and include a laminated means for directing a magnetic flux from the shaped coil into the interfacing portions of the articles.

5. The induction heating pressure welding apparatus according to claim 1, wherein there is a coil for each of the articles to be welded mounted to the the second bus bar of each set.

6. The induction heating pressure welding apparatus according to claim 2, wherein the coil is split into first and second induction coil portions, each portion pivotally mounted in electrical contact at one split side to the second bus bar of each set, and including means mounted to the first bar of each set and mounted in electrical contact with the coils for closing and opening the other split sides in the clearance space between the articles simultaneously with the longitudinal movement of the second bus bar of each set by the second bus bar moving means.

7. The induction heating pressure welding apparatus according to claim 6, wherein there is a split coil for each of the articles to be welded pivotally mounted at one split side to the second bus bar of each set, the closing and opening means closing and opening the other slit sides of the two split coils in the clearance space between the interfacing sections of the articles simultaneously with the longitudinal movement in unison of the second bus bar of each set by the second bus bar moving means.

* * * * *